(12) United States Patent
Liao (10) Patent No.: US 9,547,590 B2
(45) Date of Patent: Jan. 17, 2017

(54) MANAGING MEMORY (71) Applicant: EMC Corporation, Hopkinton, MA (US)

(72) Inventor: Guoxing Liao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 14/572,039

(22) Filed: Dec. 16, 2014

(65) Prior Publication Data
US 2015/0186269 A1  Jul. 2, 2015

(30) Foreign Application Priority Data
Dec. 26, 2013  (CN) .......................... 2013 1 0750628

(51) Int. Cl.
*G06F 12/00* (2006.01)
*G06F 12/06* (2006.01)
*G06F 13/16* (2006.01)
*G06F 12/10* (2016.01)
*G06F 11/34* (2006.01)
G06F 12/02 (2006.01)

(52) U.S. Cl.
CPC .......... *G06F 12/0638* (2013.01); *G06F 11/34* (2013.01); *G06F 12/1072* (2013.01); *G06F 13/1663* (2013.01); *G06F 12/0246* (2013.01); *G06F 2212/205* (2013.01); *G06F 2212/7208* (2013.01)

(58) Field of Classification Search
CPC .............. G06F 12/0246; G06F 12/0638; G06F 12/1072; G06F 11/34; G06F 13/1663; G06F 2212/205; G06F 2212/7208
See application file for complete search history.

(56) References Cited

U.S. PATENT DOCUMENTS

| | | | | |
|---|---|---|---|---|
| 6,148,377 A | * | 11/2000 | Carter .................. | G06F 9/5016 707/E17.12 |
| 2014/0089377 A1 | * | 3/2014 | Kurihara ........... | H04W 52/0261 709/202 |

* cited by examiner

*Primary Examiner* — Shawn X Gu
(74) *Attorney, Agent, or Firm* — Krishnendu Gupta; Konrad R. Lee (57) ABSTRACT

Embodiments of the present disclosure provide a method and apparatus for managing memory. Embodiments of the present disclosure, is related to a method and apparatus for managing memory, comprising: monitoring usage status of memory in a first computer device so as to determine available addresses; mapping at least one part of the available addresses to externally accessible shared addresses; and managing the shared addresses on the basis of a memory table so that the at least one part of the available addresses are accessible to a second computer device via the shared addresses, wherein the memory is connected to a dual in-line memory module interface of the first computer device.

16 Claims, 8 Drawing Sheets

Fig. 7B

MANAGING MEMORY

RELATED APPLICATION

This Application claims priority from Provisional Application Serial No. CN201310750628.9 filed on Dec. 26, 2013 entitled "METHOD AND APPARATUS FOR MANAGING MEMORY," the content and teachings of which are hereby incorporated by reference in their entirety.

FIELD OF INVENTION

Various embodiments of the present disclosure relate to resource management, and more specifically, for managing memory.

BACKGROUND

With the development of computer hardware techniques, there have been advancements made in various types of communication interfaces and storage media, and these techniques provide a hardware basis for achieving higher-speed memory access. With the development of computer software techniques and high-speed network techniques, resource sharing can be achieved across a plurality of computer devices. Increasing the efficiency of resource sharing has become a focus of attention.

Memory resources can be shared between a plurality of computer devices. There may be levels of memory on the basis of difference in access speed. For example, a computer device may have multiple levels of memory, such as cache, internal memory and hard disk. Since these memories have different hardware features and access speed, their sharing policies also differ.

Sharing of memory devices like hard disks has been achieved. However, due to limitations of memory's access speed and transmission efficiency between the memory and the central processing unit (CPU) of a computer device, efficiently sharing memory between a plurality of computer devices poses a challenge. Various embodiments of the present disclosure focuses on how to achieve memory sharing, and thus reference made to the memory throughout the context of the present disclosure refers to the memory in a computer device.

In an existing cluster environment typically each computer device (e.g. server) in the cluster has its own memory. Since the memory size is a critical factor affecting the computer device's data processing capability, to cause the computer device to have higher data processing capability, usually a large-capacity memory is configured in the computer device. While running a different application, the computer device often requires support of different amounts of memory, and therefore needs for memory vary considerably between the peak value and the valley value.

When the computer device executes a large application, shortage of memory resources might occur; when the computer device is lightly loaded, however, a number of memory resources may be free. The memory (e.g. Random Access Memory (RAM)) is still at a high price, so it is desired to share memory between a plurality of computer devices so as to increase the utilization efficiency of memory and further reduce the cost.

SUMMARY

Therefore, there exists a need to develop a technical solution for managing memory, that can support memory sharing between a plurality of computer devices, and implement the technical solution without changing existing configuration of computer devices in a cluster environment.

In one embodiment of the present disclosure, there is provided a method for managing memory that includes monitoring usage status of memory in a first computer device so as to determine available addresses; mapping at least one part of the available addresses to externally accessible shared addresses; and managing the shared addresses on the basis of a memory table so that the at least one part of the available addresses are accessible to a second computer device via the shared addresses, wherein the memory is connected/coupled to a dual in-line memory module interface of the first computer device.

In one embodiment of the present disclosure, the mapping at least one part of the available addresses to the externally accessible shared addresses includes registering at least one part of the available addresses to a network adapter of the first computer device; and obtaining a shared address corresponding to the at least one part of the available addresses on the basis of configuration of the network adapter.

In one embodiment of the present disclosure, there is provided a method for managing memory including in response to a memory shortage occurring in a second computer device, requesting memory from a first computer device, wherein the memory is a memory in accordance with the present disclosure.

In one embodiment of the present disclosure, there is releasing the memory in response to the second computer device completing using the memory.

In one embodiment of the present disclosure there is provided an apparatus for managing memory that includes a monitoring module configured to monitor usage status of memory in a first computer device so as to determine available addresses; a mapping module configured to map at least one part of the available addresses to externally accessible shared addresses; and a managing module configured to manage the shared addresses on the basis of a memory table so that the at least one part of the available addresses are accessible to a second computer device via the shared addresses, wherein the memory is connected/coupled to a dual in-line memory module interface of the first computer device.

In one embodiment of the present disclosure the mapping module includes a registering module configured to register at least one part of the available addresses to a network adapter of the first computer device; and an obtaining module configured to obtain a shared address corresponding to the at least one part of the available addresses on the basis of configuration of the network adapter.

In one embodiment of the present disclosure, there is provided an apparatus for managing memory that includes a requesting module configured to, in response to a memory shortage occurring in a second computer device, request memory from a first computer device, wherein the memory is a memory in accordance with the present disclosure.

In one embodiment of the present invention, there is a releasing module configured to release the memory in response to the second computer device completing using the memory. Each of the separate modules disclosed above may be combined into a single module to perform the task method disclosed above.

By means of the methods and apparatuses as described in the present disclosure, a technical solution for managing memory can be provided, which can support memory sharing between a plurality of computer devices so as to utilize free memory resources in a lightly loaded computer device and reduce the hardware cost of the computer device while increasing the resource utilization efficiency.

BRIEF DESCRIPTION OF THE SEVERAL VIEWS OF THE DRAWINGS

Through the more detailed description in the accompanying drawings, the above and other objects, features and advantages of the embodiments of the present disclosure will become more apparent. Several embodiments of the present disclosure are illustrated schematically and are not intended to limit the present disclosure. In the drawings.

DETAILED DESCRIPTION

Some preferable embodiments will be described in more detail with reference to the accompanying drawings, in which the preferred embodiments of the present disclosure will be illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
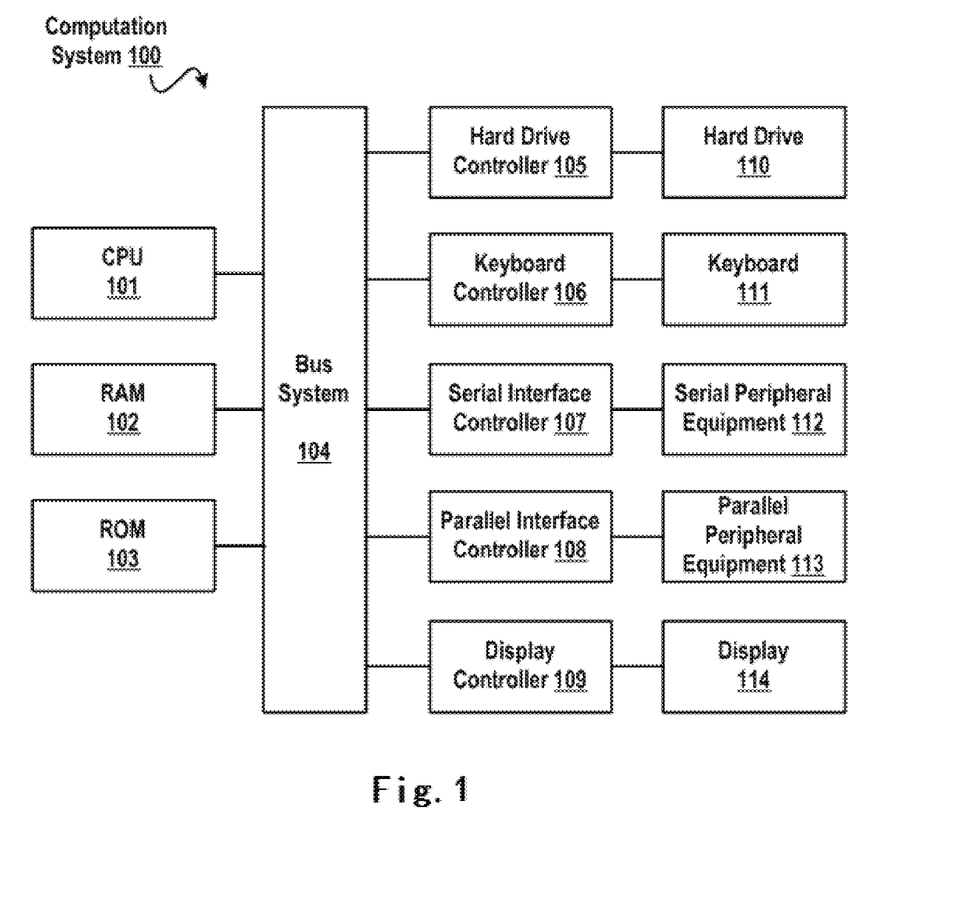
FIG. 1 schematically illustrates a block diagram of an exemplary computer system which is applicable to implement the embodiments of the present disclosure.

FIG. 1 illustrates an exemplary computer system 100 that is capable of implementing embodiments of the present disclosure. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than to be construed as a limitation to the embodiments of the present disclosure. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
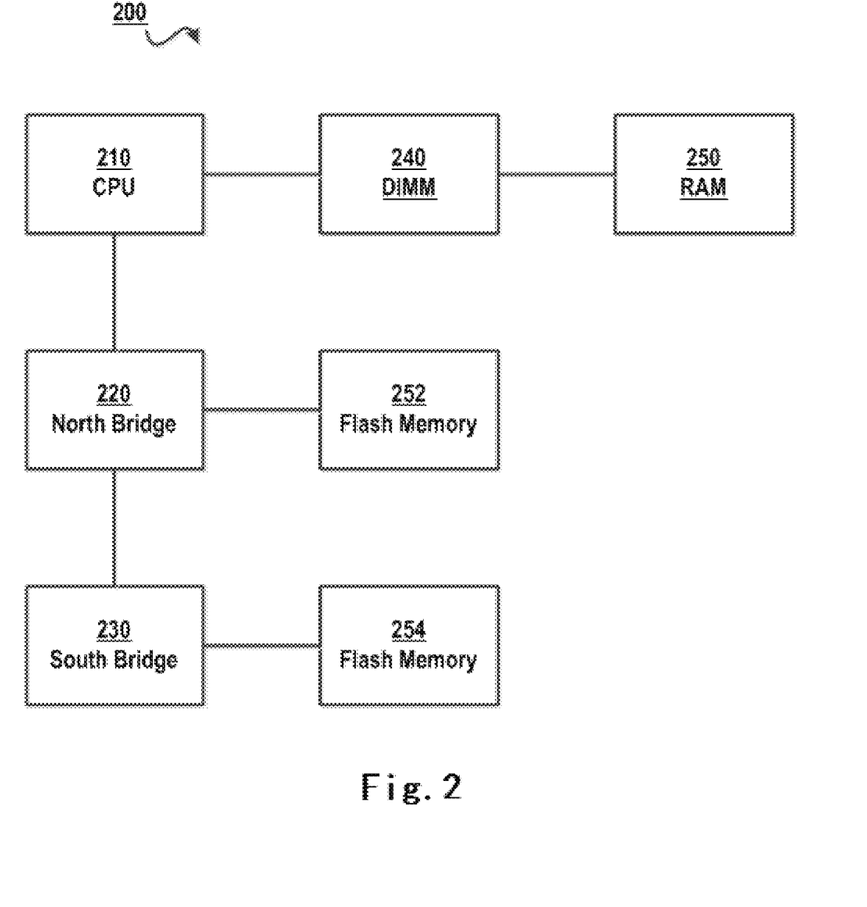
FIG. 2 schematically illustrates an architecture diagram of memory connection relationships according to one embodiment of the present disclosure.

FIG. 2 schematically illustrates an exemplary architecture diagram 200 of memory connection relationships according to one embodiment of the present disclosure. As shown in FIG. 2, a CPU 210 is connected to memory (e.g. RAM 250) through a dual in-line memory module (DIMM) interface. DIMM offers a 64-bit data channel and thus provides high speed data access. In addition, CPU 210 may further be connected to a north bridge 220 and a south bridge 230, and flash memory (e.g. flash memory 252 and 254) may be connected to north bridge 220 and south bridge 230 respectively. North bridge 220 and south bridge 230 may transmit data between CPU 210 and flash memory 252/254. Those skilled in the art should understand CPU's 210 access speed to flash memory 252/254 is not as good as its access speed to RAM 250, and there is a considerable difference.

Note although flash memory 252 and 254 can expand the capacity of memory available to CPU to some extent, due to limitations with self data transmission speed and time latency of north bridge 220 and south bridge 230, CPU's 210 access speed to flash memory 252 and 254 is not considered to be satisfactory enough.

Embodiments of the present disclosure as shown in FIG. 2 have certain disadvantages. On the one hand, although CPU 210 can access RAM 250 via DIMM 240 at high speed, as RAM 250 is priced highly and its capacity is rather limited, installing large-capacity RAM on the computer device may not be handy. On the other hand, although flash memory 252 and 254 is relatively cheap and has large capacity, as the access speed of CPU 210 to the flash memory via north bridge 220 and south bridge 230 is rather satisfactory, the flash memory fails to provide strong support in expanding the memory capacity.

Therefore, it is a need to provide a technical solution for managing memory in a computer device more effectively, and also provide free memory space for usage by other computer device while expanding the memory capacity of the computer device.

Figure 3:
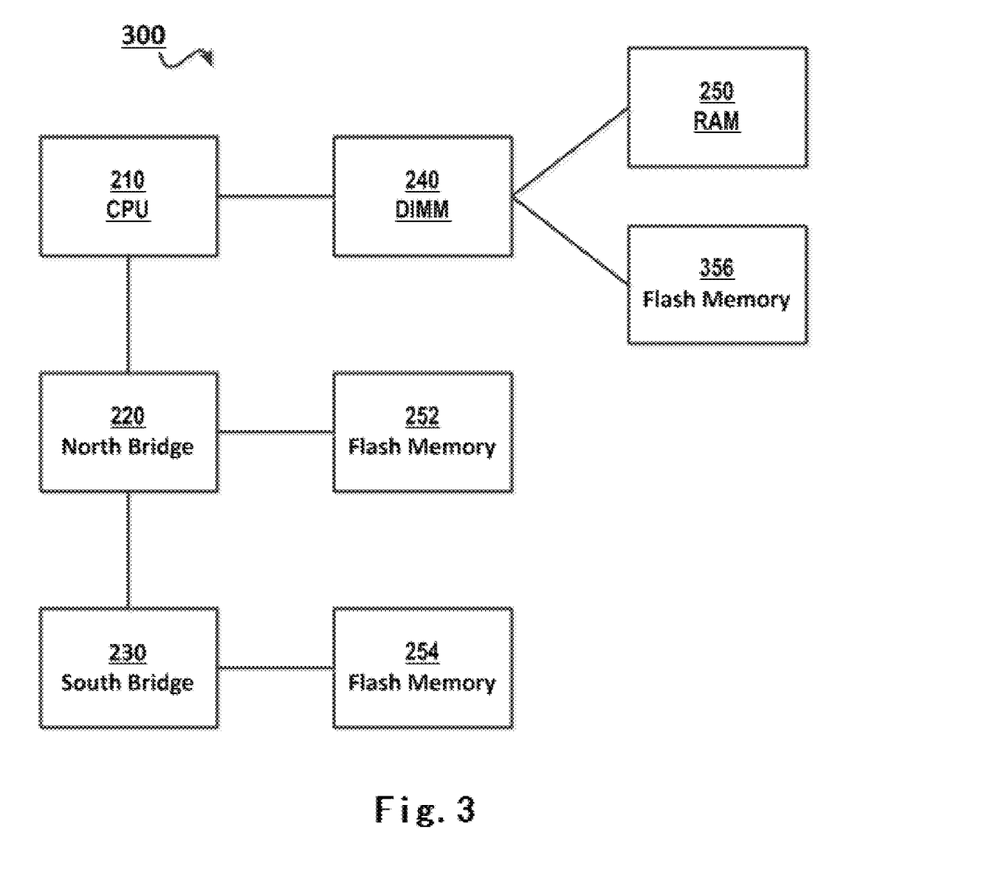
FIG. 3 schematically illustrates an architecture diagram of memory connection relationship according to one embodiment of the present disclosure.

To this end, various embodiments of the present disclosure provide a method and apparatus for managing memory. Specifically, FIG. 3 schematically shows an architecture diagram 300 of memory connection relationships according to one embodiment of the present disclosure. As shown in FIG. 3, architecture diagram 300 differs from architecture diagram 200 in FIG. 2 in besides RAM 250, further connecting flash memory 356 to DIMM 240.

Thereby, CPU 210 can access RAM 250 and/or flash memory 356 via DIMM 240. On the one hand, RAM 250 boasts higher data access speed and can provide high speed but low latency memory to CPU 210; while on the other hand, flash memory 356 is at a low cost and may have a larger storage capacity. In addition, the data access speed supported by DIMM 240 interface is relatively higher than that supported by north bridge 220 and south bridge 230, so faster and larger-capacity memory may be provided to CPU 210.

According to the architecture diagram shown in FIG. 3, not only the computer device's own memory capacity can be expanded, but also when the computer device's workload is low, free memory resources may be provided to other computer device. On the basis of the principle shown in FIG. 3, one embodiment of the present disclosure provides a method for managing memory that includes monitoring usage status of memory in a first computer device so as to determine available addresses; mapping at least one part of the available addresses to an externally accessible shared address; and managing the shared addresses on the basis of a memory table so that the at least one part of the available addresses are accessible to a second computer device via the shared addresses, wherein the memory is connected to a dual in-line memory module interface of the first computer device.

Note throughout the context of the present disclosure the term "available address" refers to a free memory address in memory of the first computer device that is currently not occupied by any application.

Further note throughout the context of the present disclosure, the term "shared address" refers to an address that is accessible via a network by one or more second computer devices. Moreover, in the present disclosure the "shared address" is accessed exclusively. In other words, once any part of these addresses are allocated to a certain second computer device, then these addresses can only be accessed by the second computer device exclusively; before the part of addresses are released by the second computer device, and cannot be accessed by other computer device.

Figure 4:
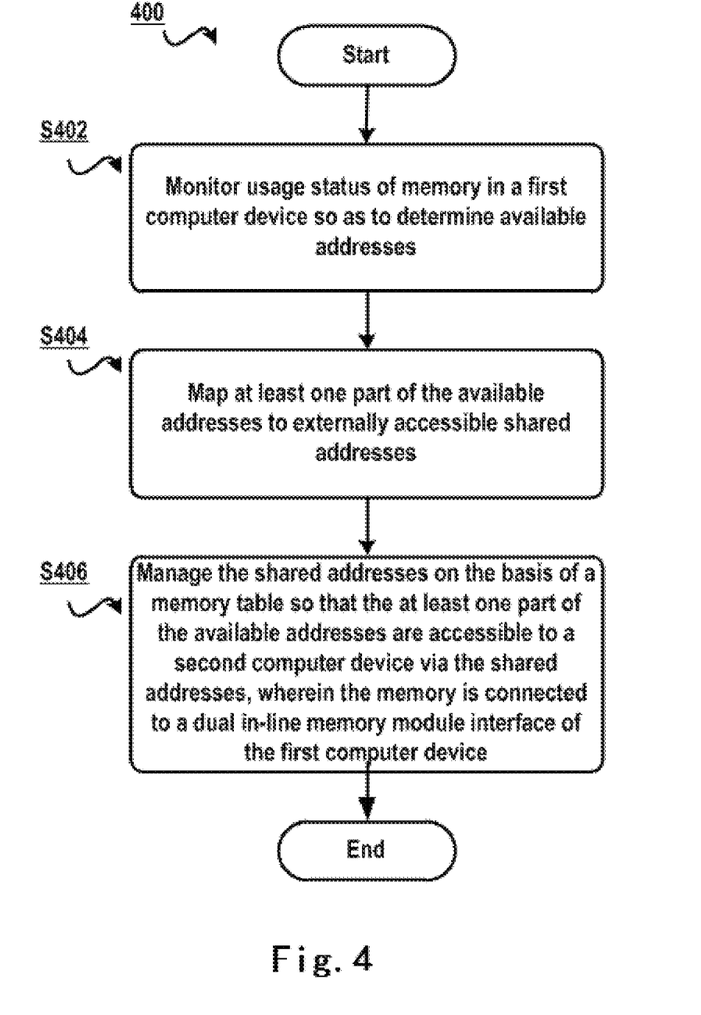
FIG. 4 schematically illustrates a flowchart of a method for managing memory according to one embodiment of the present disclosure.

FIG. 4 schematically shows a flowchart 400 of a method for managing memory according to one embodiment of the present disclosure. Specifically, in step S402 usage status of memory in a first computer device is monitored so as to determine available addresses, wherein the memory is connected to a dual in-line memory module interface of the first computer device.

Specifically, working status of each address range in the memory may be recorded so as to determine available addresses. In this embodiment, the available addresses may be one or more address ranges in the memory, for example address ranges [0x00 . . . 1 . . . 0, 0x00 . . . 4 . . . 0], [0x00 . . . 8 . . . 0, 0x00 . . . F . . . 0], etc.

In this embodiment the computer device may also have a hybrid type of memory. For example, flash memory has use flash solid state drive (SSD), and alternatively, may further use phase change memory. In addition to concrete types of memory as mentioned in the present disclosure, those skilled in the art may further use other type of storage device that is currently known or to be developed later, so long as CPU can communicate with the storage device via the DIMM interface.

In step S404, at least one part of the available addresses are mapped to an externally accessible shared address. The computer device may select one part of available addresses according to a predetermined sharing policy. For example, it may be predetermined which type of memory is to be selected from hybrid memory, it may be predetermined how much memory space is reserved for the usage of the computer device, etc. Specifically, since the access speed of memory of RAM type is relatively high, a large proportion of RAMs may be reserved for usage by the computer device; or all RAMs may be used for the computer device itself, and one part of addresses in the flash memory (e.g. no more than 15%) are used for other computer device.

In step S406, the shared addresses are managed on the basis of a memory table so that a second computer device can access at least one part of the available addresses via the shared address. A memory table may be maintained for managing a portion of the memory that is selected from the available addresses and mapped to the shared address. The memory table may maintain the current usage status of the shared addresses so as to support the second computer device to access the at least one part of the available addresses via the shared addresses. In this embodiment, the shared address is a memory address that is accessible to other computer device (e.g. second computer device) via a network.

Note according to the principle of the present disclosure, although the first computer device can access its own memory via the shared address, the present disclosure mainly relates to a second computer device other than the first computer device accessing the memory in the first computer device.

In specific implementation, the first computer device may obtain memory resources required by employing other techniques. For example, the first computer device may use a "global memory table" to record usage status (e.g. available and occupied) of memory. When one part of the available addresses are mapped to a shared address, the status of this part of addresses is marked as "occupied." The first computer device may first request memory resources from the "global memory table;" and if not satisfactory, then the first computer device may request to access an address that is not yet occupied by any other computer device among the shared addresses of the first computer device; and if still not satisfactory, then the first computer device may request to access a shared address of other computer device.

In one embodiment of the present disclosure, mapping at least one part of the available addresses to externally accessible shared addresses includes registering the at least one part of the available addresses to a network adapter of the first computer device; and obtaining a shared address corresponding to the at least one part of the available addresses on the basis of configuration of the network adapter.

According to various embodiments of the present disclosure, the memory needs to be shared via a network between various computer devices. Therefore, the shared address needs to be registered with the network adapter of the first computer device. Those skilled in the art should understand the first computer device may communicate with other computer devices via the network adapter, so the available address of the memory needs to be converted into externally accessible shared addresses on the basis of configuration of the network adapter.

Figure 5:
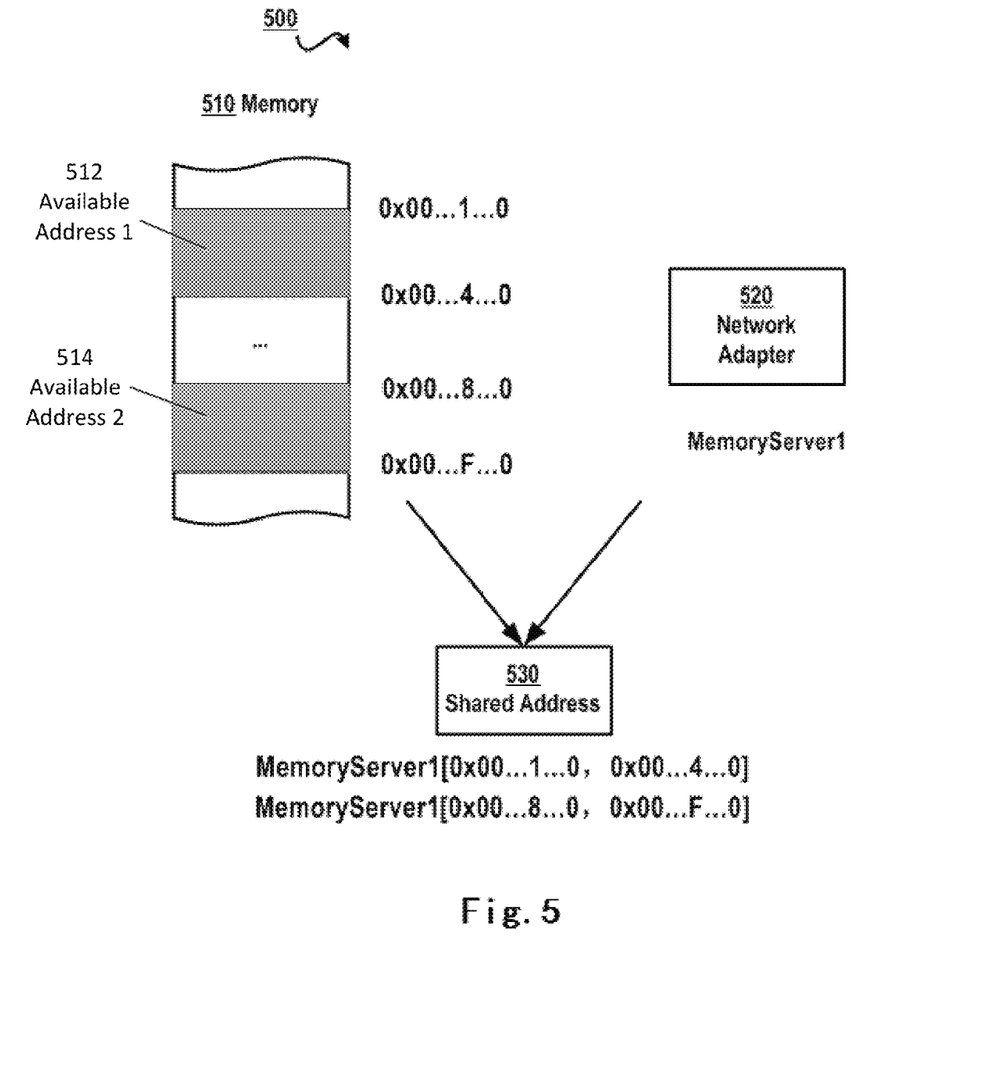
FIG. 5 schematically illustrates a block diagram of address mapping relationship according to one embodiment of the present disclosure.

Briefly speaking, an address of the network adapter may be added before (or at other position of) the available address so that other computer device may first find, via the address of the network adapter, the first computer device providing the shared memory and then access the shared memory according to the memory address within the first computer device. With reference to FIG. 5, there is shown a block diagram 500 of address mapping relationships according to one embodiment of the present disclosure.

As shown in FIG. 5, suppose memory 510 comprises available address 1 512 [0x00 . . . 1 . . . 0, 0x00 . . . 4 . . . 0], available address 2 514 [0x00 . . . 8 . . . 0, 0x00 . . . F . . . 0], etc.; and suppose the address of the network adapter is "MemoryServer1," then a shared address with respect to available addresses 1 512 and 2 514 may be represented as a shared address 530, and specifically, shared address 530 may be represented as:

MemoryServer1[0x00 . . . 1 . . . 0, 0x00 . . . 4 . . . 0];
MemoryServer1[0x00 . . . 8 . . . 0, 0x00 . . . F . . . 0];

The illustration made above is merely an example of a format of the shared address, and those skilled in the art may further adopt other format.

In one embodiment of the present disclosure, the memory table describes usage status of the shared address, usage status at least comprising "available" and "occupied," and initially usage status being "available." Since the shared address is an address that is accessible via a network to other computer device, the usage status in the memory table refers to status whether the memory is occupied by other computer device other than the first computer device. Initially, the entire range of the shared addresses may be set as "available." Specifically, the memory table may be represented using a data structure as shown in Table 1 below. Those skilled in the art should understand Table 1 merely illustrates an example of the data structure of the memory table, and alternatively, other data structure may further be used to define the memory table.

TABLE 1

Memory Table

| No. | Shared Address | Usage Status | User |
|---|---|---|---|
| 1 | MemoryServer1[0x00 . . . 1 . . . 0, 0x00 . . . 4 . . . 0] | Available | NULL |
| 2 | MemoryServer1[0x00 . . . 8 . . . 0, 0x00 . . . F . . . 0] | Available | NULL |
| . . . | . . . | . . . | . . . |

In one embodiment of the present disclosure, managing the shared addresses on the basis of a memory table so that at least one part of the available addresses are accessible to a second computer device via the shared addresses includes in response to a use request from the second computer device, allocating to the second computer device at least one part of shared addresses with "available" usage status among the shared addresses; and updating usage status of the at least one part of shared addresses as "occupied."

When receiving a request from the second computer device, memory in the first computer device may be allocated to the second computer device. Since the memory table saves information regarding whether the shared addresses are "available" or not, a shared address with "available" usage status among the shared addresses may be allocated to the second computer device on the basis of contents in a "usage status" column in the memory table.

As some ranges of the shared addresses are occupied by other computer devices, status of shared addresses within these ranges may be updated as "occupied." For example, suppose a current memory table is as shown in Table 1 above, when the second computer device (e.g. with a device name of MemoryClient1) requests a memory space of 100 MB, it may access 100M memory with "available" usage status within a range MemoryServer1[0x00 . . . 1 . . . 0, 0x00 . . . 4 . . . 0] among the shared addresses. An address range MemoryServer1[0x00 . . . 1 . . . 0, 0x00 . . . 2 . . . 0] is allocated to the second computer device, at which point the memory table is updated as shown in Table 2.

TABLE 2

Updated Memory Table

| No. | Shared Address | Usage Status | User |
|---|---|---|---|
| 1 | MemoryServer1[0x00 . . . 1 . . . 0, 0x00 . . . 2 . . . 0] | occupied | MemoryClient1 |
| 2 | MemoryServer1[0x00 . . . 2 . . . 0, 0x00 . . . 4 . . . 0] | available | NULL |
| 3 | MemoryServer1[0x00 . . . 8 . . . 0, 0x00 . . . F . . . 0] | available | NULL |
| . . . | . . . | . . . | . . . |

In one embodiment of the present disclosure, disclosed is in response to a release request from the second computer device, releasing a shared address corresponding to the release request; and updating usage status of the released shared address as "available." Continuing the foregoing example, after the second computer device releases memory having an address range of MemoryServer1[0x00 . . . 1 . . . 0, 0x00 . . . 4 . . . 0], the memory table may be updated once again and the updated memory table is as shown in Table 1 above.

Figure 6:
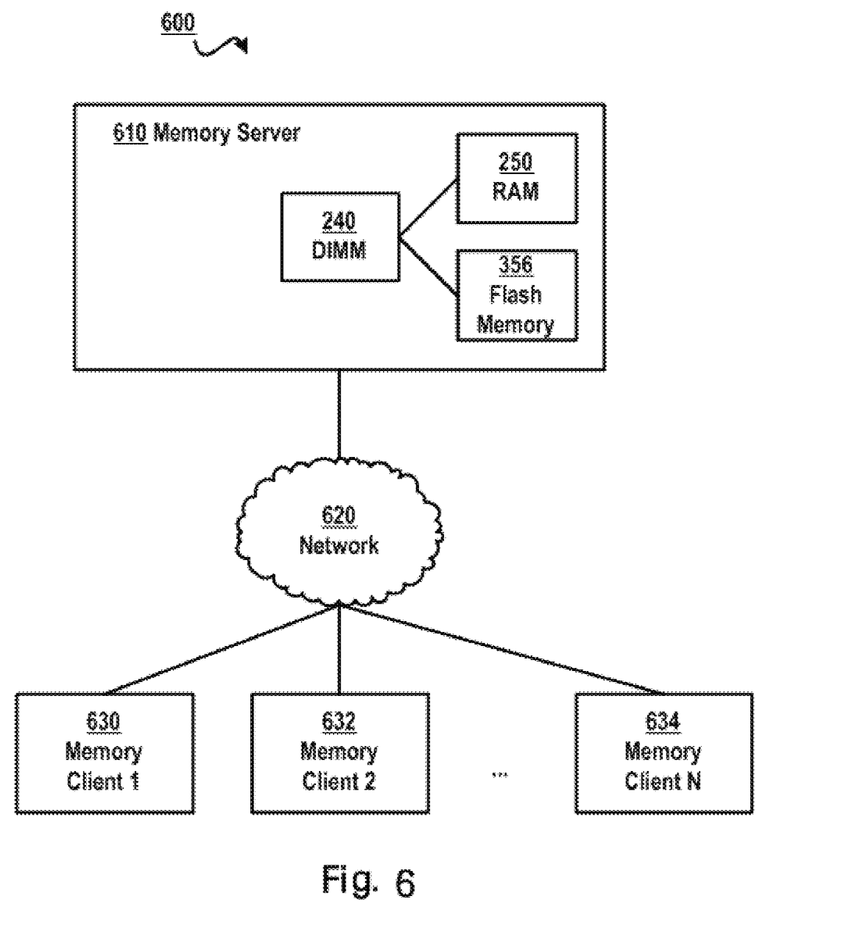
FIG. 6 schematically shows an architecture diagram of a technical solution for sharing memory between a memory server and a memory client according to one embodiment of the present disclosure.

FIG. 6 schematically shows an architecture diagram 600 of a technical solution for sharing memory between a memory server (corresponding to the first computer device) and a memory client (corresponding to the second computer device) according to one embodiment of the present disclosure. As shown in FIG. 6, in a memory server 610, RAM 250 and flash memory 356 may be connected to DIMM 240. At this point, at least one part of memory space in RAM 250 and flash memory 356 may be accessed by other computer device via shared addresses.

A memory client 1 630, a memory client 2 632 and a memory client N 634 may access a shared part of memory in memory server 610 via shared addresses through a network 620. Note the embodiments of the present disclosure are not intended to limit the amount of memory servers and memory clients in the computer device cluster, but note the memory server and the memory client are relative concepts.

For example, when a computer device A shares its own memory with other computer device, computer device A acts as the memory server in relation to the other computer device consuming memory; however, when memory resources of computer device A are insufficient and computer device A is requesting memory resources to other computer device, computer device A becomes the memory client in relation to the other computer device supplying shared resources. In addition, according to the embodiments of the present disclosure, one computer device may concurrently act as not only the memory server but also the memory client.

Since the speed at which the computer device accesses other computer device is usually lower than the speed at which the computer device accesses its own memory resources, the situation where memory of the computer device is exhausted and the computer device has to request memory resources to other memory server should be avoided to the extent possible.

According to the embodiments of the present disclosure, various measures may be taken to avoid the situation where the computer device acting as a memory server is typically short of memory resources. For example, a maximum value of shared memory may be set, for example, at most 15% of total memory resources are shared; after the memory client uses memory resources, resources being allocated previously may be returned to the memory server; where necessary, a shared address whose current usage status is "available" may be returned to the memory server; or where necessary, the memory client is notified to release allocated resources, and these resources are returned to the memory server, etc.

In one embodiment of the present disclosure in response to a resource shortage occurring in the first computer device, returning to the first computer device memory associated with at least one part of shared addresses with "available" usage status; demapping the returned memory to corresponding shared addresses. In this embodiment, a resource with "available" usage status is currently not used by any computer device and belongs to free memory resources, so the memory may be returned to the first computer device so as to be called by an application running on the first computer device.

In one embodiment of the present disclosure in response to a release request from the second computer device, returning to the first computer device memory associated with a shared address corresponding to the release request; and demapping the returned memory to corresponding shared addresses.

In this embodiment, resources released by the second computer device may be directly returned to the first computer device so as to be called by an application running on the first computer device, no matter whether a memory resource shortage occurs in the first computer device. In various embodiments of the present disclosure, usage status of memory in the first computer device may be monitored periodically; when the usage status matches the sharing policy, available addresses may be determined using the above mentioned method. Thereby, more available memory resources may be reserved for the first computer device.

In one embodiment of the present disclosure, "returnable" usage status may further be set in the memory table, the status representing that a corresponding shared address is currently free and may be returned as a priority when the first computer device is in short of resources.

In one embodiment of the present disclosure, the memory is at least one of: solid state memory, solid state disk memory phase change memory and random access memory. These memories may have varied data access efficiency, varied capacities and varying hardware costs.

With reference to the accompanying drawings, detailed description has been presented to concrete implementation of a memory server for sharing memory with other computer device. With respect to the memory server, various embodiments of the present disclosure further provide a method for using memory in a memory server.

In one embodiment of the present disclosure, there is provided a method for managing memory where, in response to a memory shortage occurring in a second computer device, requesting memory from a first computer device. In this embodiment, the second computer device acts as a memory client and requests memory resources in the first computer device (acting as a memory server) in case of a memory resource shortage.

In one embodiment of the present disclosure, the memory is released in response to the second computer device completing using the memory. When the memory client completes usage, memory allocated by the first computer device to the second computer device may be released. Subsequently, the first computer device may handle the memory released by the second computer device as described above.

Figure 7A:
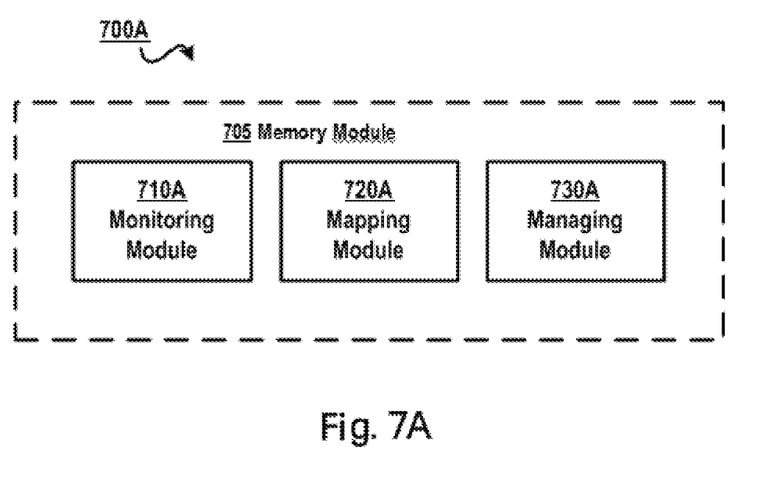
FIGS. 7A and 7B schematically show block diagrams for managing memory according to one embodiment of the present disclosure, respectively.
Figure 7B:
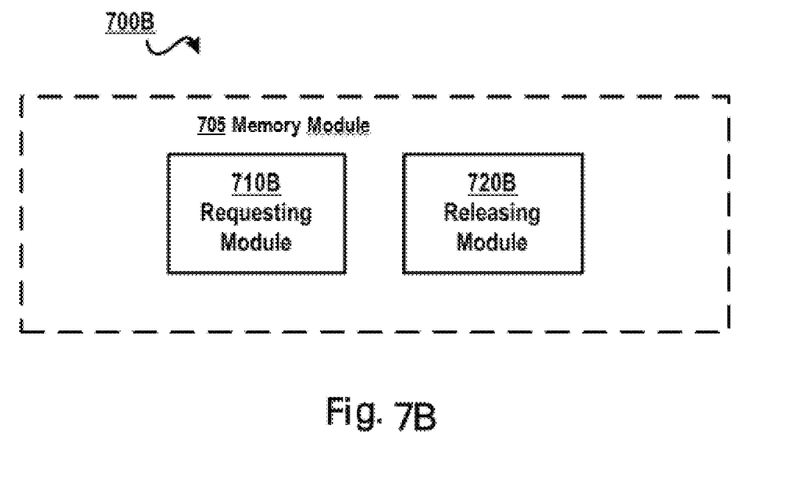

FIGS. 7A and 7B schematically show block diagrams 700A and 700B for managing memory according to one embodiment of the present disclosure, respectively. Specifically, FIG. 7A provides an apparatus for managing memory having a monitoring module 710A configured to monitor usage status of memory in a first computer device so as to determine available addresses; a mapping module 720A configured to map at least one part of the available addresses to externally accessible shared addresses; and a managing module 730A configured to manage the shared addresses on the basis of a memory table so that the at least one part of the available addresses are accessible to a second computer device via the shared addresses, wherein the memory is connected to a dual in-line memory module interface of the first computer device. Advantageously, each of the mapping module, the monitoring module and the managing module, and any sub-components (registering module, obtaining module etc., mentioned below) associated with any of these modules, can be combined together into a single memory module configured to perform the individual tasks of each of these modules or sub-modules/components.

In one embodiment of the present disclosure, mapping module 720A includes a registering module configured to register the at least one part of the available addresses to a network adapter of the first computer device; and an obtaining module configured to obtain a shared address corresponding to the at least one part of the available addresses on the basis of configuration of the network adapter.

In one embodiment of the present disclosure, the memory table describes usage status of the shared addresses, the usage status at least comprising "available" and "occupied," and initially the usage status is "available."

In one embodiment of the present disclosure, managing module 730A includes an allocating module configured to, in response to a use request from the second computer device, allocate to the second computer device at least one part of shared addresses with "available" usage status among the shared addresses; and a first updating module configured to update usage status of the at least one part of shared addresses as "occupied."

In one embodiment of the present disclosure, there further includes a first releasing module configured to, in response to a release request from the second computer device, release a shared address corresponding to the release request; and a second updating module configured to update usage status of the released shared address as "available."

In one embodiment of the present disclosure, there further includes a first returning module configured to, in response to a resource shortage occurring in the first computer device, return to the first computer device memory associated with at least one part of shared addresses with "available" usage status; and a first demapping module configured to demap the returned memory to corresponding shared addresses.

In one embodiment of the present disclosure, there includes a second returning module configured to, in response to a release request from the second computer device, return to the first computer device memory associated with a shared address corresponding to the release request; and a second demapping module configured to demap the returned memory to corresponding shared addresses.

In one embodiment of the present disclosure, the memory is at least one of: solid state disk memory, phase change memory and random access memory.

FIG. 7B provides an apparatus for managing memory, that includes a requesting module 710B configured to, in response to a memory shortage occurring in a second computer device, request memory from a first computer device.

In one embodiment of the present disclosure, there further includes a releasing module 720B configured to release the memory in response to the second computer device completing using the memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing memory, comprising:
monitoring usage status of memory in a first computer device to determine available memory addresses;
mapping at least one part of the available memory addresses to externally accessible shared memory addresses; and
managing the shared memory addresses based on a memory table such that the at least one part of the available memory addresses are accessible to a second computer device via the shared memory addresses, and the memory is connected to a dual in-line memory module interface of the first computer device;

wherein mapping at least one part of the available memory addresses to the externally accessible shared memory addresses comprises:

registering the at least one part of the available memory addresses with a network adapter of the first computer device; and obtaining a shared memory address corresponding to the at least one part of the available memory addresses based on a configuration associated with the network adapter.

2. The method according to claim 1, wherein the memory table maintains information on a usage status of the shared memory addresses, comprising at least one of an "available" usage status and an "occupied" usage status; and an initial status being set as the "available" usage status.

3. The method according to claim 2, wherein managing the shared memory addresses based on the memory table so that the at least one part of the available memory addresses are accessible to the second computer device via the shared memory addresses comprises:

in response to a use request from the second computer device, allocating to the second computer device at least one part of shared memory addresses with "available" usage status among the shared memory addresses; and updating the status of the at least one part of shared memory addresses as "occupied" usage status.

4. The method according to claim 3, further comprising:
in response to a release request from the second computer device, releasing a shared memory address corresponding to the release request; and updating the released shared memory address to "available" usage status.

5. The method according to claim 3, further comprising:
in response to a release request from the second computer device, returning to the first computer device memory associated with a shared memory address corresponding to the release request; and demapping the returned memory to corresponding shared memory addresses.

6. The method according to claim 1, further comprising:
in response to a resource shortage occurring in the first computer device, returning to the first computer device memory associated with at least one part of shared memory addresses with "available" usage status; and demapping the returned memory to corresponding shared memory addresses.

7. The method according to claim 1, wherein the memory comprises at least one of a solid state memory, a solid state disk memory, a phase change memory and a random access memory.

8. An apparatus for managing memory, comprising:
a memory module configured to
monitor usage status of memory in a first computer device so as to determine available memory addresses;

map at least one part of the available memory addresses to externally accessible shared memory addresses; and manage the externally accessible shared memory addresses based on a memory table such that the at least one part of the available memory addresses are accessible to a second computer device via the shared memory addresses, and the memory is connected to a dual in-line memory module interface of the first computer device;

wherein the memory module is further configured to
register the at least one part of the available memory addresses with a network adapter of the first computer device; and obtain a shared memory address corresponding to the at least one part of the available memory addresses used on a configuration associated with the network adapter.

9. The apparatus according to claim 8, wherein the memory table maintains information on a usage status of the shared memory addresses, comprising at least one of an "available" usage status and an "occupied" usage status, and an initially status being set as the "available" usage status.

10. The apparatus according to claim 9, further configured to
in response to a use request from the second computer device, allocate to the second computer device at least one part of shared memory addresses with "available" usage status among the shared memory addresses; and update status of the at least one part of shared addresses as "occupied" usage status.

11. The apparatus according to claim 10, further configured to
in response to a release request from the second computer device, release a shared memory address corresponding to the release request; and update status of the released shared address as "available" usage status.

12. The apparatus according to claim 10, further configured to
in response to a release request from the second computer device, return to the first computer device memory associated with a shared memory address corresponding to the release request; and demap the returned memory to corresponding shared memory addresses.

13. The apparatus according to claim 8, further configured to
in response to a resource shortage occurring in the first computer device, return to the first computer device memory associated with at least one part of shared addresses with "available" usage status; and demap the returned memory to corresponding shared memory addresses.

14. The apparatus according to claim 8, wherein the memory comprises at least one of a solid state memory, a solid state disk memory, and a phase change memory and a random access memory.

15. The apparatus for managing memory according to claim 8, further configured to
in response to a memory shortage occurring in the second computer device, request memory from the first computer device.

16. The apparatus according to claim 15, further configured to release the requested memory in response to the second computer device completing using the requested memory.

* * * * *